(12) United States Patent
Park (10) Patent No.: US 11,629,764 B2
(45) Date of Patent: Apr. 18, 2023

(54) CALIPER BRAKE PAD SPRING AND BRAKE DEVICE

(71) Applicant: HYUNDAI MOBIS CO., LTD., Seoul (KR)

(72) Inventor: Sang Jun Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 178 days.

(21) Appl. No.: 17/111,960

(22) Filed: Dec. 4, 2020

(65) Prior Publication Data

US 2021/0172488 A1 Jun. 10, 2021

(30) Foreign Application Priority Data

Dec. 6, 2019 (KR) ........................ 10-2019-0161368

(51) Int. Cl.
| | |
|---|---|
| *F16D 65/097* | (2006.01) |
| *F16D 55/226* | (2006.01) |
| *F16D 65/00* | (2006.01) |
| *F16D 55/00* | (2006.01) |

(52) U.S. Cl.
CPC ....... *F16D 65/0979* (2013.01); *F16D 55/226* (2013.01); *F16D 65/0068* (2013.01); *F16D 2055/0016* (2013.01); *F16D 2055/0041* (2013.01)

(58) Field of Classification Search
CPC .. F16D 55/226; F16D 55/227; F16D 65/0006; F16D 65/0977; F16D 65/0068; F16D 65/0979; F16D 2055/0016; F16D 2055/0041
USPC ............ 188/73.35–73.38, 73.1, 73.31, 73.32
See application file for complete search history.

(56) References Cited

U.S. PATENT DOCUMENTS

| | | | | |
|---|---|---|---|---|
| 5,947,233 | A * | 9/1999 | Kobayashi ............ | F16D 55/227 188/73.38 |
| 8,037,977 | B2 * | 10/2011 | Arakawa ............. | F16D 65/0977 188/73.38 |
| 10,316,912 | B2 * | 6/2019 | Crippa ................. | F16D 65/0006 |
| 2004/0262099 | A1 * | 12/2004 | Crippa ................. | F16D 65/0977 188/73.35 |
| 2016/0146278 | A1 * | 5/2016 | Roberts ................. | F16D 55/226 188/73.38 |
| 2021/0356006 | A1 * | 11/2021 | D'Alessio ........... | F16D 65/0068 |
| 2022/0056969 | A1 * | 2/2022 | Fumagalli ............... | F16D 55/22 |

FOREIGN PATENT DOCUMENTS

KR 10-2017-0046908 5/2017

* cited by examiner

*Primary Examiner* — Christopher P Schwartz
(74) *Attorney, Agent, or Firm* — H.C. Park & Associates, PLC (57) ABSTRACT

Provided is a caliper brake pad spring applying load to a brake pad in a set position. A spring mounting unit is mounted on a window of a caliper body. Spring pressing units extend from both sides of the spring mounting unit in one direction to apply load to a brake pad by pressing the brake pad.

18 Claims, 8 Drawing Sheets

CALIPER BRAKE PAD SPRING AND BRAKE DEVICE

CROSS-REFERENCE TO RELATED APPLICATION

This application claims priority from and the benefit of Korean Patent Application No. 10-2019-0161368, filed on Dec. 6, 2019, which is hereby incorporated by reference for all purposes as if set forth herein.

BACKGROUND

Field

Exemplary embodiments of the present disclosure relate to a caliper brake pad spring, and more particularly, to a caliper brake pad spring applying load to a brake pad in a set position.

Discussion of the Background

In general, a brake device of a vehicle is an important device used to decelerate or stop the vehicle or maintain the vehicle in a parked position. The brake device generally uses a friction brake that performs a braking action by reducing kinetic energy of the vehicle using frictional force and discharging energy generated by the friction to the air.

The brake device includes a main brake used when driving a vehicle and a parking brake used when parking the vehicle. An operating mechanism of the brake device includes a mechanical type using a rod and a wire and a hydraulic type using hydraulic pressure.

The main brake may be divided into a pneumatic brake using compressed air and a servo brake using suction negative pressure of the engine or compressed air so as to enhance operating power, in addition to the hydraulic type.

In addition, the hydraulic brake is divided into a drum brake and a disk brake, due to a brake body generating braking power by receiving hydraulic pressure generated by a master cylinder.

The drum brake includes a wheel cylinder, a brake shoe, a back plate on which the wheel cylinder and the brake shoe are mounted, a brake drum, and the like. The disk brake is configured to perform braking by pressing braking pads to both sides of a brake disk, rotating together with a wheel, using hydraulic pressure. This is referred to as a caliper type.

A caliper is a hydraulic device for braking a front wheel by bringing a pad of a vehicle into close contact with a disk, and is also referred to as a caliper brake.

According to the principle of operation of the caliper brake, when a cylinder is subjected to hydraulic pressure during operation of the brake, brake oil in the cylinder generates hydraulic pressure so that force acts within the cylinder in a transverse direction. Here, the force acting in the transverse direction presses the brake pad to the brake disk, thereby generating frictional force. At this time, the movement of the brake pad may generate noise, which is problematic. Therefore, an improvement is required to solve this problem.

A background technology of the present disclosure is disclosed in Korean Patent Application Publication No. 10-2017-0046908 (titled: "DISK BRAKE DEVICE FOR VEHICLE"; published on May 4, 2017).

The above information disclosed in this Background section is only for enhancement of understanding of the background of the invention and, therefore, it may contain information that does not constitute prior art.

SUMMARY

Exemplary embodiments of the present invention provide a caliper brake pad spring applying load to a brake pad in a set position.

In order to realize the objective, according to the present disclosure, a caliper brake pad spring may include: a spring mounting unit mounted on a window of a caliper body; and spring pressing units extending from both sides of the spring mounting unit in one direction and configured to apply load to a brake pad by pressing the brake pad.

In addition, the spring mounting unit may include: a first spring mounting plate disposed within the window; second spring mounting plates extending from first both side portions of the first spring mounting plate so as to be bent in one direction, connected to the spring pressing units, and having pressing hole portions; and pressing protrusions extending from the first spring mounting plate so as to be bent in one direction, disposed within the pressing hole portions, and configured to press the window due to elastic restoring force.

The spring mounting unit may further include stoppers extending from second both side portions of the first spring mounting plate so as to be bent in the other direction and being in close contact with the window due to elastic restoring force.

Each of the stoppers may include: a first stopper plate extending from the second both side portions in a direction opposite to the second spring mounting plates; a second stopper plate extending from the first stopper plate toward the second spring mounting plates; and a third stopper plate extending from the second stopper plate so as to be rounded to surround the window, and being in close contact with the window due to elastic restoring force.

Each of the stoppers may further include a contact portion extending from the third stopper plate toward the caliper body so as to be bent and being in contact with the caliper body.

Each of the spring pressing units may include: a first spring pressing plate extending from the second spring mounting plates so as to be inclined in a direction opposite to the first spring mounting plate; and a second spring pressing plate extending from the first spring pressing plate so as to be inclined in a direction opposite to the first spring mounting plate, being in contact with the brake pad, and configured to press the brake pad.

Each of the spring pressing units may further include a brake pad damage preventing portion extending from the second spring pressing plate so as to be bent in a direction opposite to the brake pad.

The first spring pressing plate may include rebound support portions configured to support rebound force of the first spring pressing plate in contact with the caliper body.

The first spring pressing plate may have weight-reducing hole portions.

In addition, according to the present disclosure, a brake device may include: a brake disk; a caliper body configured to surround the brake disk; guide pins fitted into the caliper body; brake pads disposed on both sides of the brake disk and being movable along the guide pins; a return spring being in contact with the brake pad and configured to restore the brake pads to original positions by applying elastic restoring force to the brake pads; and a piston configured to press the brake pads toward the brake disk; and a pad spring including a spring mounting unit mounted on a window of the caliper body and spring pressing units extending from both sides of the spring mounting unit in one direction and configured to apply load to the brake pads by pressing the brake pads.

The caliper brake pad spring according to the present disclosure is mounted on the window of the caliper body so as to apply load to the brake pads by pressing the brake pads at a set position during braking or in the release of braking, thereby minimizing a difference in the load. In addition, since the caliper brake pad spring may be moved toward the brake pads or away from the brake pads in a position in which the brake pads are in contact with the guide pins, there is an effect in that rattle noise may be prevented.

In addition, due to the pressing protrusions and the stoppers, the brake pad spring may be in close contact with the window of the caliper body and continuously maintain the set position. The caliper brake pad spring may be easily mounted on the window. Accordingly, the assembling ability thereof may be improved.

In addition, according to the present disclosure, when the caliper brake pad spring is mounted on the window of the caliper body through the contact portion, there is an effect in that the caliper brake pad spring may be prevented from being separated from the caliper body.

In addition, according to the present disclosure, there is an effect in that the brake pad damage preventing portion may prevent the brake pad from being damaged when the caliper brake pad spring presses the brake pad.

In addition, according to the present disclosure, there is an effect in that, since the rebound force of the caliper brake pad spring is supported by the rebound support portions, the caliper brake pad spring may more reliably press the brake pad.

In addition, according to the present disclosure, there is an effect in that the weight of the caliper brake pad spring may be reduced due to the weight-reducing hole portions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, a caliper brake pad spring according to an embodiment of the present disclosure will be described with reference to the accompanying drawings.

In the following description, the thicknesses of lines or the sizes of components illustrated in the drawings may be exaggerated for clarity and convenience of explanation. In addition, terms used herein are defined in consideration of functions thereof in the present disclosure, but may vary depending on the intentions of users or operators, or practices. Therefore, the terms shall be defined on the basis of the description throughout the specification.

Figure 1:
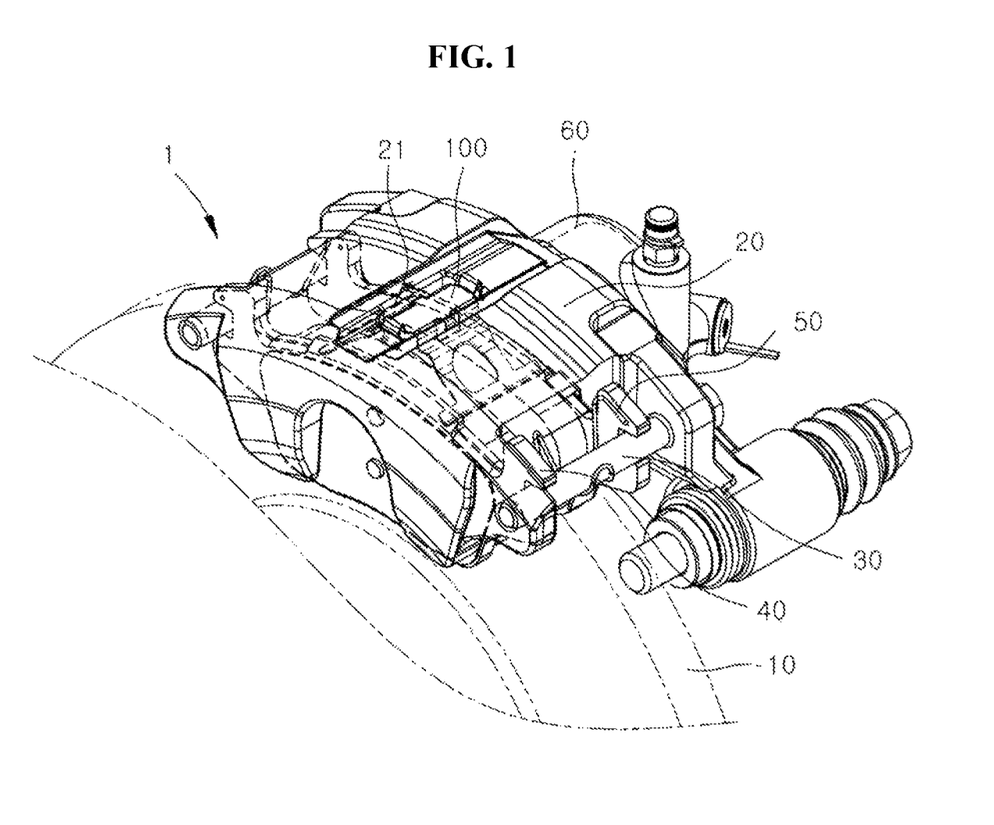
FIG. 1 is a view schematically illustrating a brake device according to an embodiment of the present disclosure.
Figure 2:
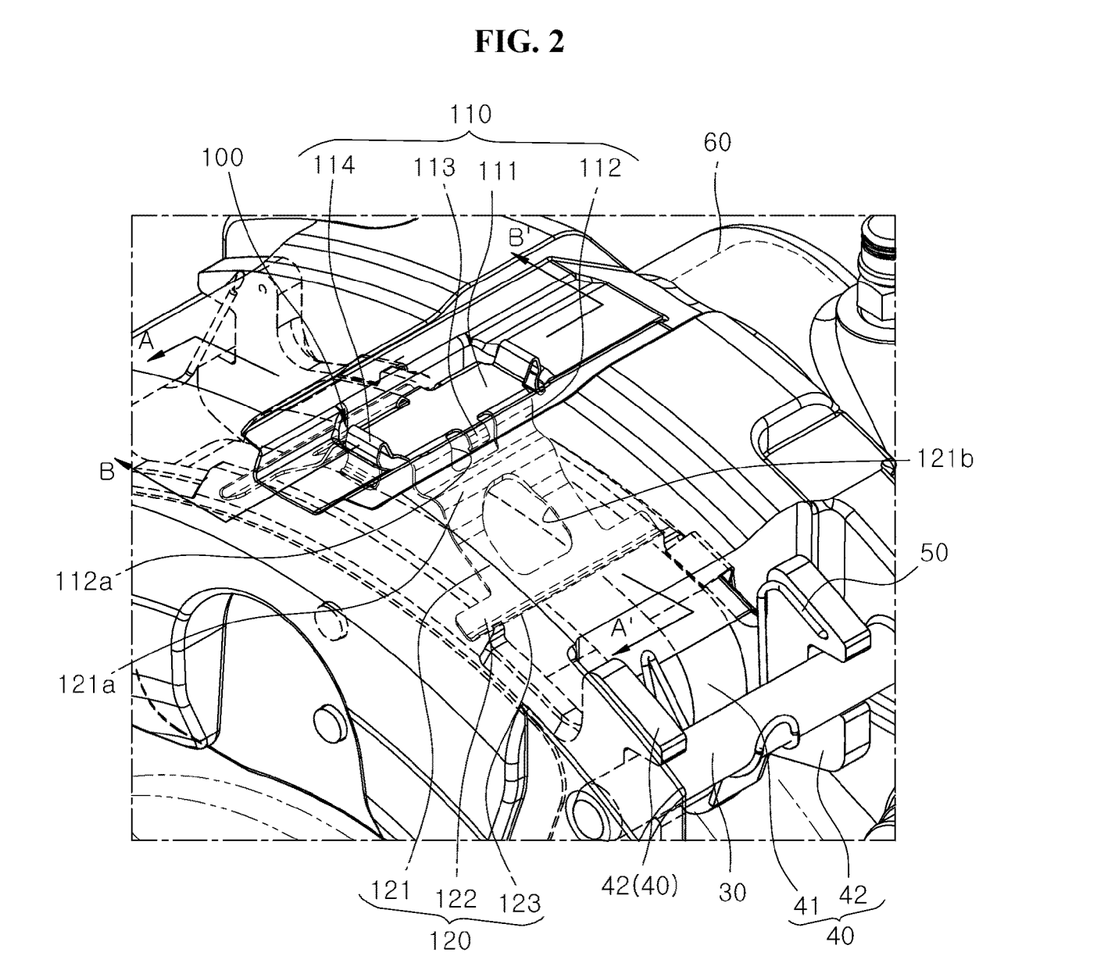
FIG. 2 is an enlarged view of a part of FIG. 1, including the caliper brake pad spring.
Figure 3:
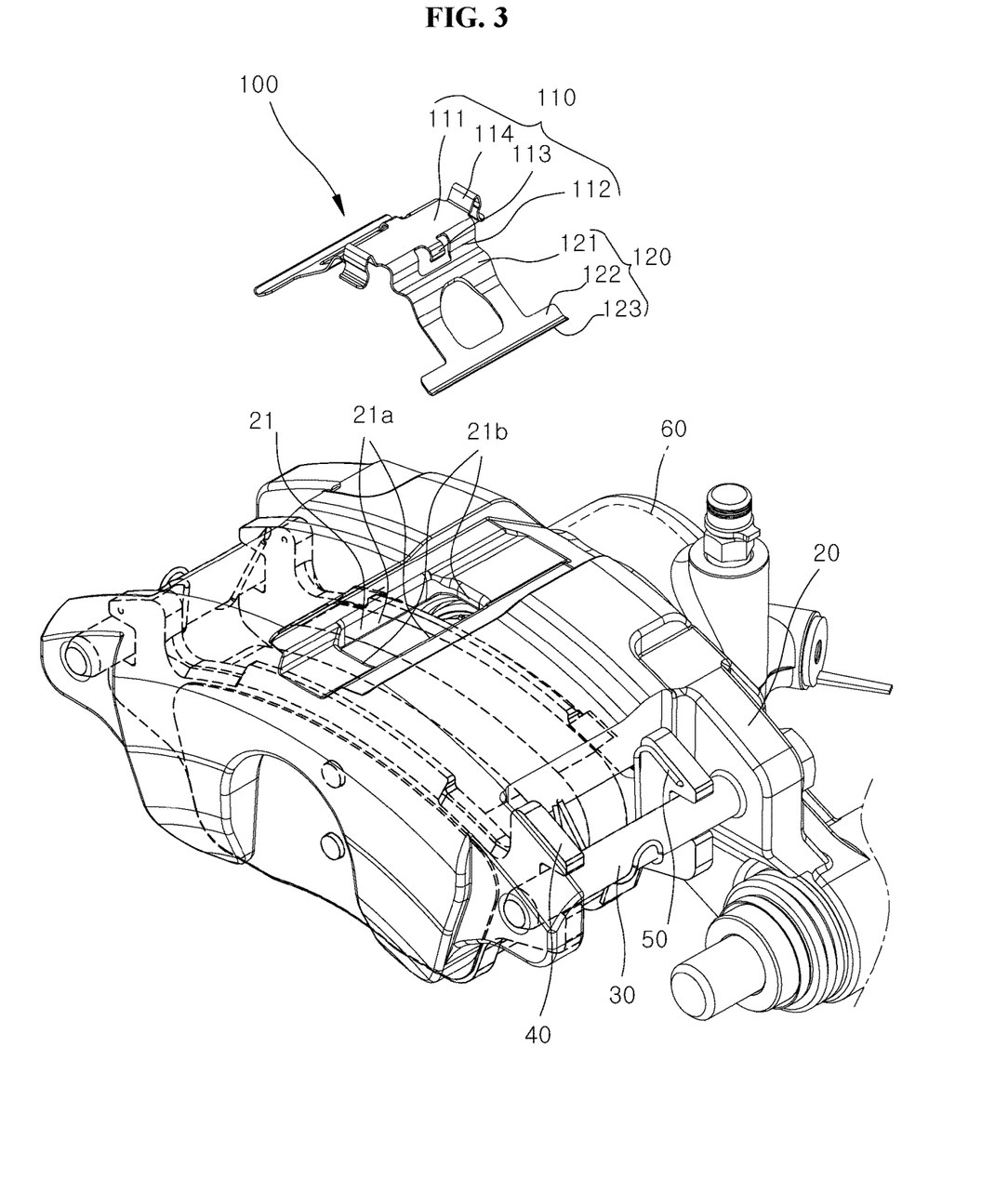
FIG. 3 is a view illustrating the brake device according to an embodiment of the present disclosure, from which the caliper brake pad spring is separated.
Figure 4:
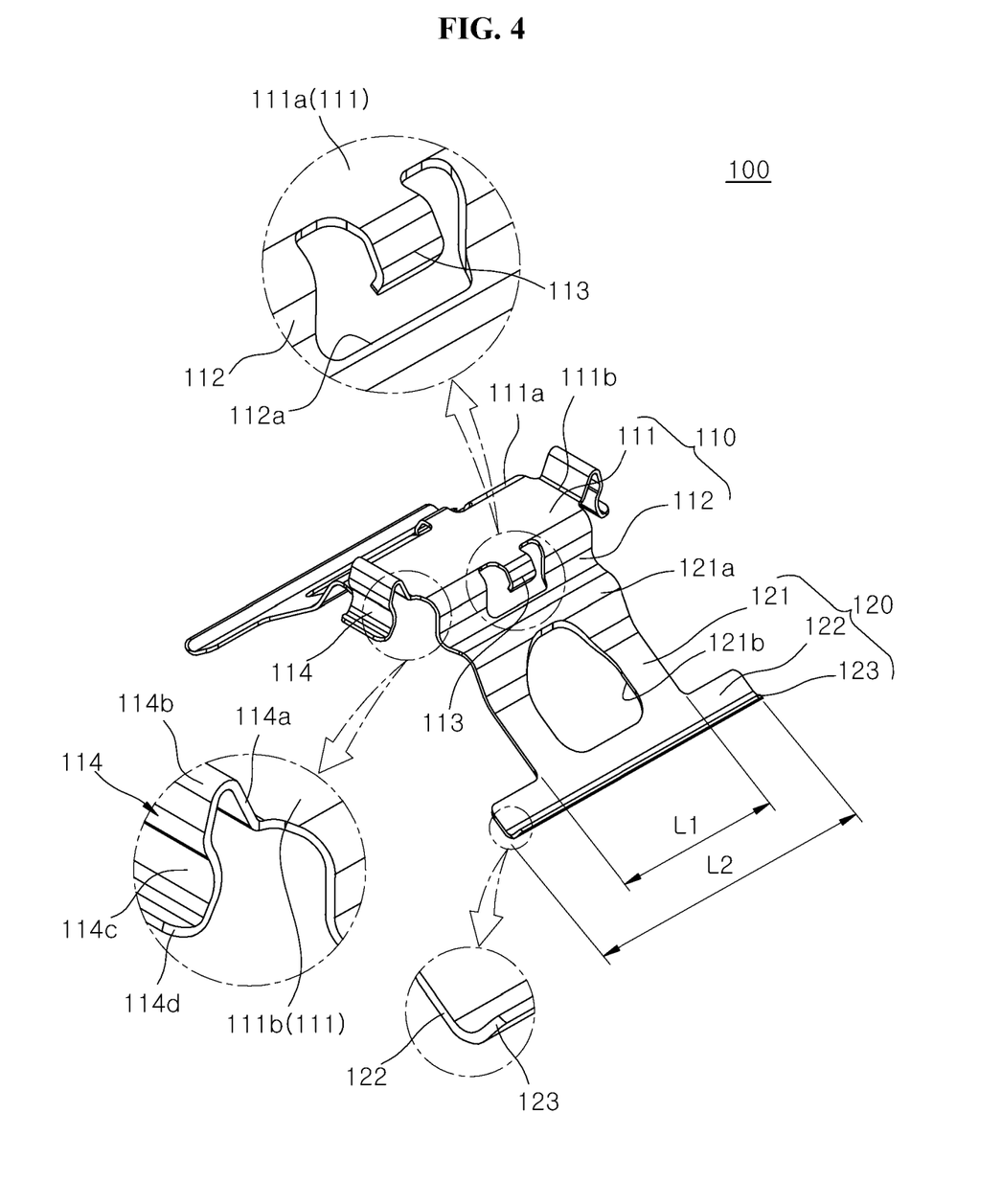
FIG. 4 is a perspective view illustrating the caliper brake pad spring according to an embodiment of the present disclosure.
Figure 5:
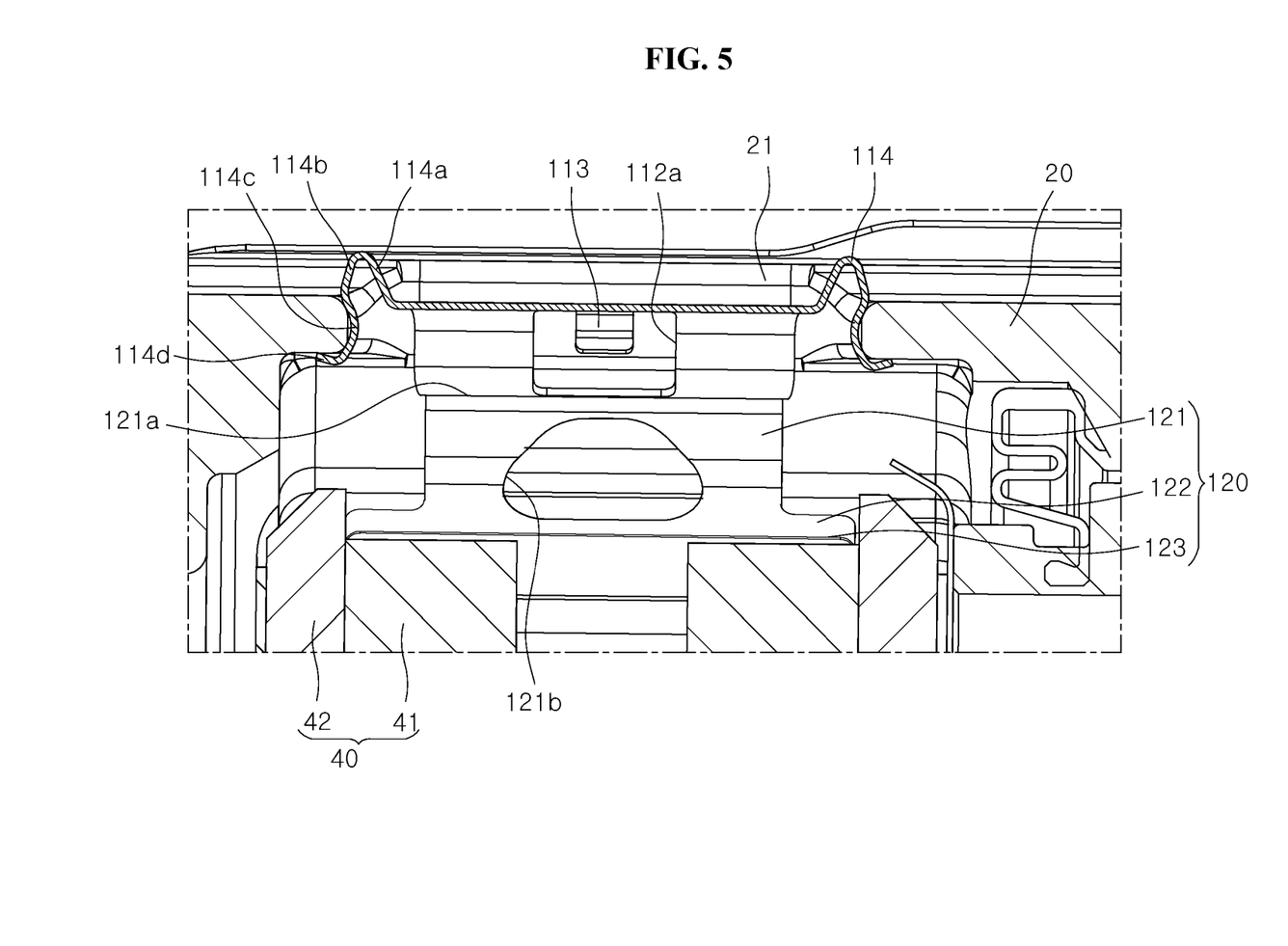
FIG. 5 is a cross-sectional view illustrating key portions, taken along the line A-A' in FIG. 2.
Figure 6:
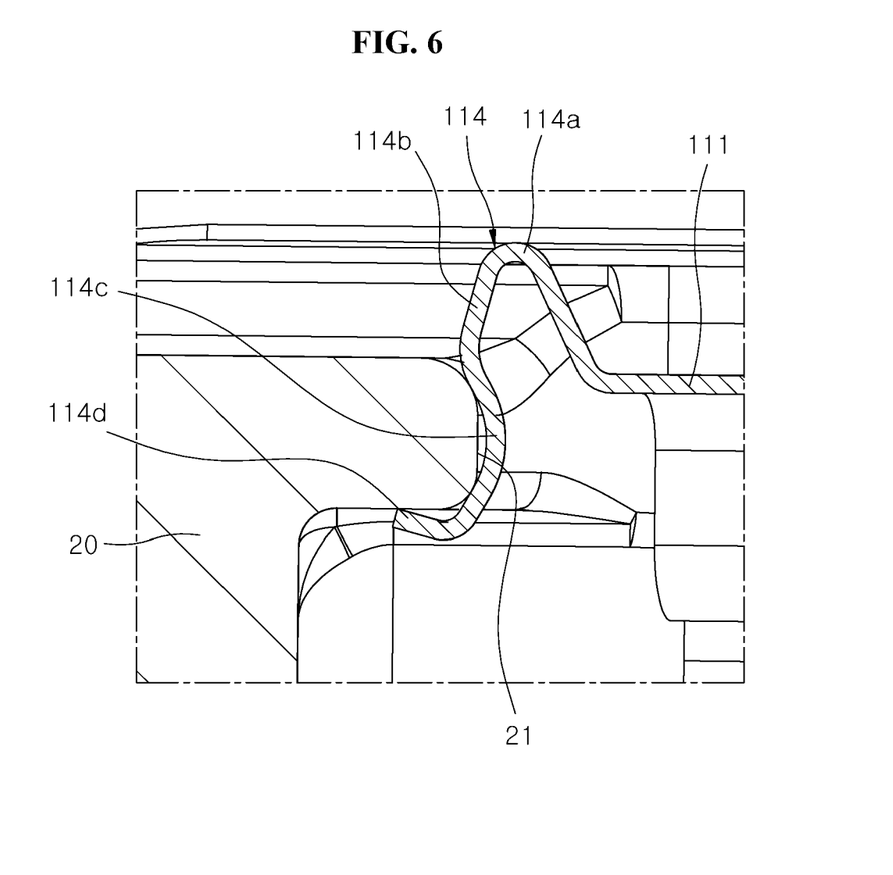
FIG. 6 is an enlarged view of FIG. 5.
Figure 7:
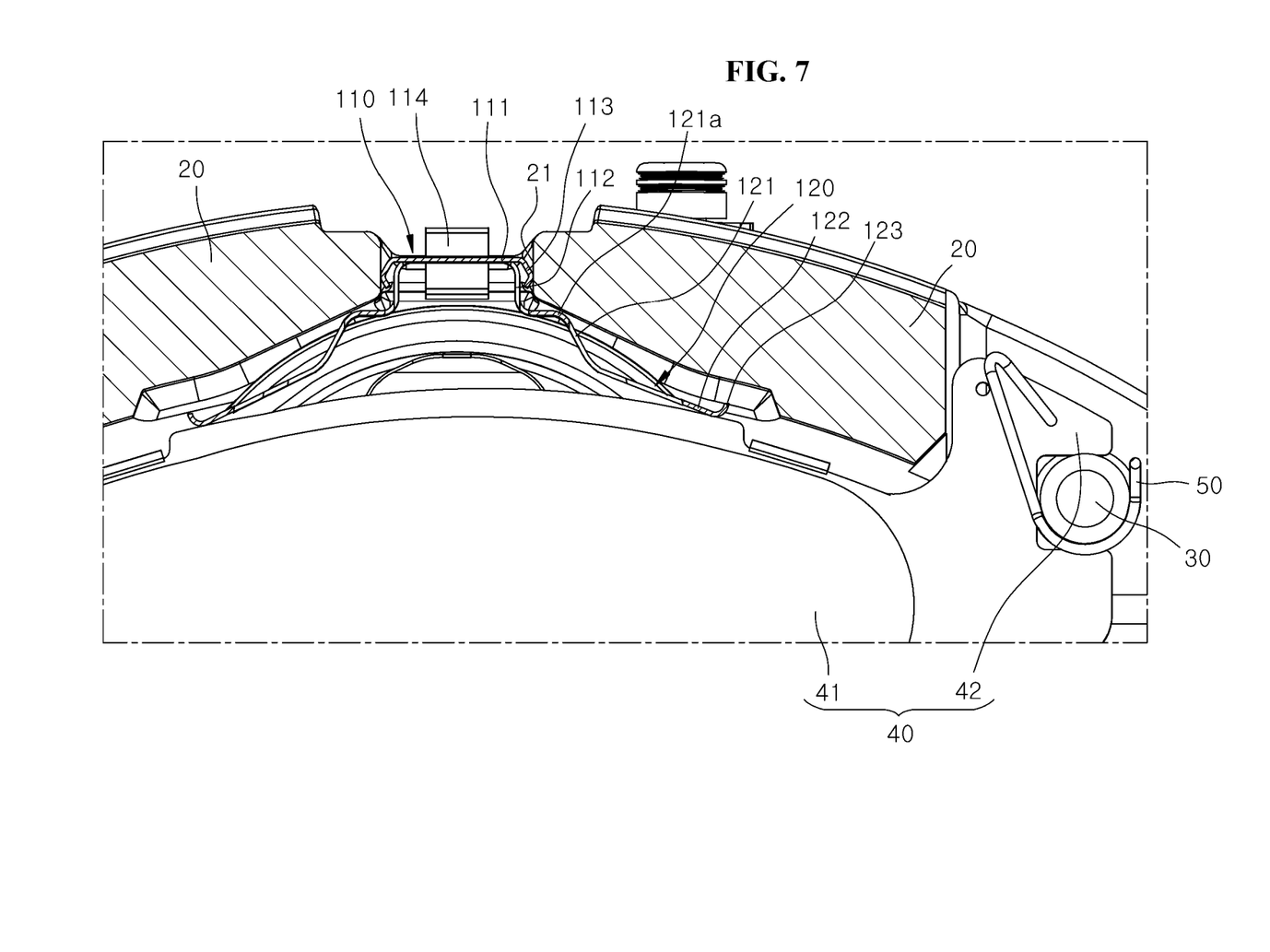
FIG. 7 is a cross-sectional view illustrating key portions, taken along the line B-B' in FIG. 2.
Figure 8:
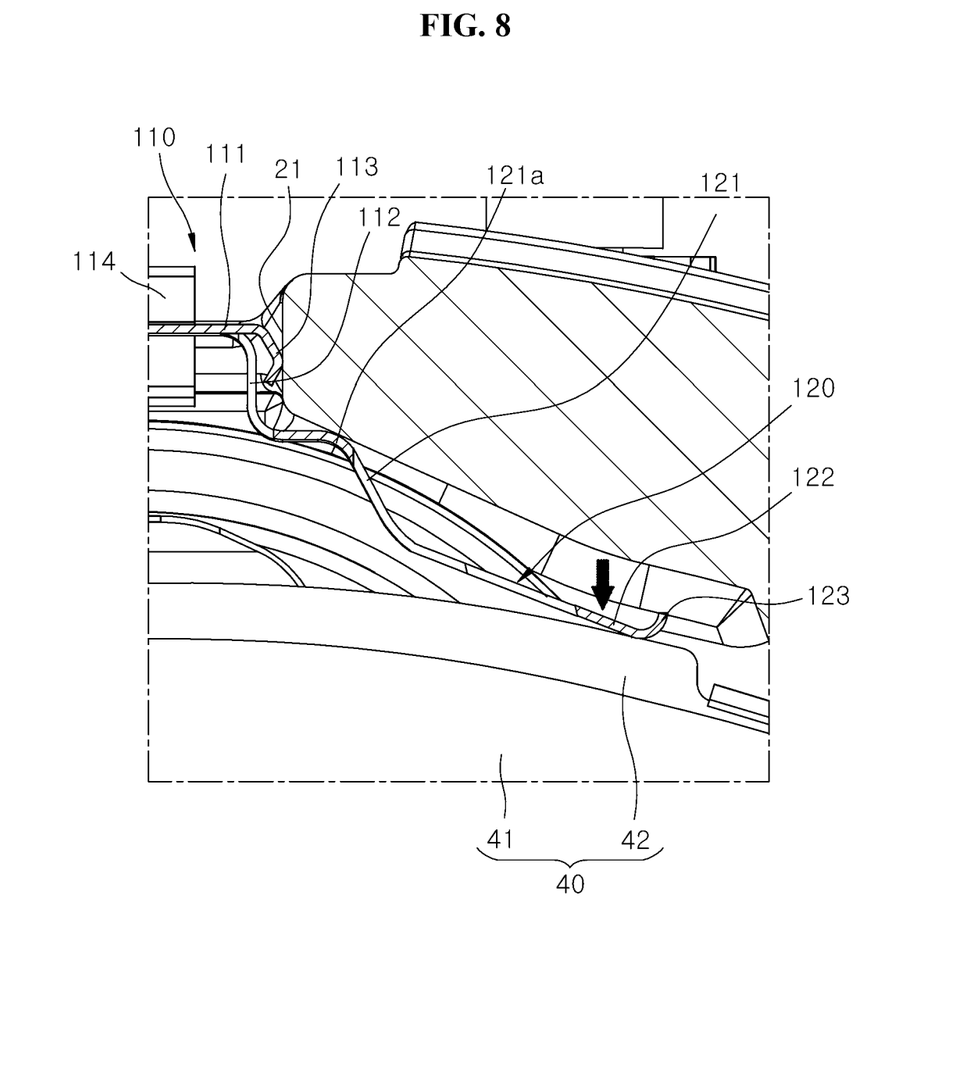
FIG. 8 is an enlarged view of FIG. 7.

FIG. 1 is a view schematically illustrating a brake device according to an embodiment of the present disclosure, FIG. 2 is an enlarged view of a part of FIG. 1, including the caliper brake pad spring, FIG. 3 is a view illustrating the brake device according to an embodiment of the present disclosure, from which the caliper brake pad spring is separated, FIG. 4 is a perspective view illustrating the caliper brake pad spring according to an embodiment of the present disclosure, FIG. 5 is a cross-sectional view illustrating key portions, taken along the line A-A' in FIG. 2, FIG. 6 is an enlarged view of FIG. 5, FIG. 7 is a cross-sectional view illustrating key portions, taken along the line B-B' in FIG. 2, and FIG. 8 is an enlarged view of FIG. 7.

Referring to FIGS. 1 to 4, a brake device 1 according to an embodiment of the present disclosure includes a brake disk 10, a caliper body 20, guide pins 30, brake pads 40, return springs 50, a piston 60, and a caliper brake pad spring 100. The brake disk 10 has a disk shape, is coupled to a vehicle wheel (not shown), and rotates together with the vehicle wheel.

The caliper body 20 surrounds the brake disk 10 and has a window 21 on the top surface thereof (in FIGS. 1 and 2). The brake pads 40 are disposed within the caliper body 20.

The guide pins 30 are fitted into the caliper body 20. The brake pads 40 are disposed on both sides of the brake disk 10, and are mounted to be movable along the guide pins 30.

Each of the brake pads 40 includes a friction member 41 and back plates 42. The friction member 41 is in contact with the brake disk 10. The back plates 42 are coupled to the friction member 41, and are movably mounted on the corresponding guide pin 30.

Each of the return spring 50 surrounds an outer surface portion of the corresponding guide pin 30, and restores the corresponding brake pad 40 to the original position by providing elastic restoring force to the brake pads 40. That is, when the piston 60 presses the brake pad 40 during braking, the return spring 50 is elastically deformed. When the piston 60 stops pressing the brake pad 40 in the release of braking, the return spring 50 restores the brake pad 40 to the original position due to elastic restoring force.

The piston 60 presses the brake pad 40 toward the brake disk 10 in response to hydraulic pressure transmitted to the caliper body 20. The piston 60 may be disposed within the caliper body 20.

The caliper brake pad spring 100 is disposed on the window 21 of the caliper body 20. The caliper brake pad spring 100 applies load to the brake pad 40 by pressing the brake pad 40, thereby enabling the brake pad 40 to move while being in contact with the guide pin 30. Consequently, rattle noise that would be produced by impact between components due to vibration may be prevented. In addition, since the caliper brake pad spring 100 is in close contact with the window 21, the caliper brake pad spring 100 may apply load to the brake pad 40 by pressing the brake pad 40 in an assembled position, i.e. a set position, even during braking or in the release of braking.

The caliper brake pad spring 100 according to an embodiment of the present disclosure includes a spring mounting unit 110 and spring pressing units 120. The spring mounting unit 110 is mounted on the window 21 of the caliper body 20 (see FIG. 2).

The spring pressing units 120 extend from both sides of the spring mounting unit 110 in predetermined directions, respectively, and apply load to the brake pads 40 by pressing the brake pads 40.

The spring mounting unit 110 includes a first spring mounting plate 111, second spring mounting plates 112, pressing protrusions 113, stoppers 114. The first spring mounting plate 111 is disposed within the window 21.

The second spring mounting plates 112 extend from first both side portions 111a of the first spring mounting plate 111 so as to be bent in one direction, are connected to the spring pressing units 120, and have pressing hole portions 112a. The second spring mounting plates 112 are provided as a pair of plates extending from the first both side portions 111a of the first spring mounting plate 111 so as to be bent downward (in FIGS. 2 and 4).

The pressing protrusions 113 extend from the first spring mounting plate 111 so as to be bent in one direction, are disposed within the pressing hole portions 112a, and press the window 21 due to elastic restoring force. The pressing protrusions 113 press first side surfaces 21a of the window 21. The pressing protrusions 113 are elastically deformed through contact with the window 21, but are restored to the original positions due to elastic restoring force, thereby pressing the window 21 by close contact therewith.

The stoppers 114 extend from second both side portions 111b of the first spring mounting plate 111 so as to be bent in the other direction, and are in close contact with the window 21 due to elastic restoring force. As described above, due to the pressing protrusions 113 and the stoppers 114, the caliper brake pad spring 100 according to the present disclosure may be in close contact with the window 21 of the caliper body 20, thereby continuously maintaining an assembled position, i.e. a set position. Furthermore, since the caliper brake pad spring 100 may be easily mounted to the window 21, the assembling ability thereof may be improved.

Referring to FIGS. 5 and 6, each of the stoppers 114 includes a first stopper plate 114a, a second stopper plate 114b, a third stopper plate 114c, and a contact portion 114d. The first stopper plate 114a extends from the second both side portions 111b in the opposite direction to the second spring mounting plates 112. The first stopper plate 114a extends upward from the corresponding second both side portion 111b (in FIGS. 5 and 6).

The second stopper plate 114b extends from the first stopper plate 114a toward the second spring mounting plates 112. The second stopper plate 114b extends downward from the first stopper plate 114a (in FIGS. 5 and 6).

The third stopper plate 114c extends from the second stopper plate 114b so as to be rounded to surround the window 21, and is in close contact with the window 21 due to elastic restoring force. The third stopper plate 114c is in close contact with a corresponding one of second surfaces 21b of the window 21.

The first stopper plate 114a, the second stopper plate 114b, and the third stopper plate 114c are elastically deformed while the third stopper plate 114c is being in contact with the window 21, but are in close contact with and press the window 21 by being restored to the original positions due to elastic restoring force.

The contact portion 114d extends from the third stopper plate 114c toward the caliper body 20 so as to be bent, and is in contact with the caliper body 20. Consequently, when the caliper brake pad spring 100 is mounted on the window 21 of the caliper body 20, the caliper brake pad spring 100 may be prevented from being separated from the caliper body 20.

Referring to FIGS. 7 and 8, each of the spring pressing units 120 includes a first spring pressing plate 121, a second spring pressing plate 122, and a brake pad damage preventing portion 123. The first spring pressing plate 121 extends from the second spring mounting plates 112 so as to be inclined in the opposite direction to the first spring mounting plate 111. The first spring pressing plate 121 extends (in FIGS. 7 and 8) from the second spring mounting plates 112 so as to be inclined downward (in FIGS. 7 and 8).

The second spring pressing plate 122 extends from the first spring pressing plate 121 so as to be inclined in the opposite direction to the first spring mounting plate 111, is in contact with the brake pads 40, and presses the brake pads 40. The second spring pressing plate 122 extends from the first spring pressing plate 121 so as to be inclined downward (in FIGS. 7 and 8).

The brake pad damage preventing portion 123 extends from the second spring pressing plate 122 so as to be bent in the opposite direction to the brake pads 40. Accordingly, when the caliper brake pad spring 100 presses the brake pads 40, the brake pads 40 may be prevented from being damaged.

The first spring pressing plate 121 includes rebound support portions 121a supporting rebound force of the first spring pressing plate 121 in contact with the caliper body 20. Consequently, the rebound force of the caliper brake pad spring 100 is supported, such that the caliper brake pad spring 100 may more reliably press the brake pads 40.

The first spring pressing plate 121 has weight-reducing hole portions 121b. The weight-reducing hole portions 121b may reduce the weight of the caliper brake pad spring 100, such that the caliper brake pad spring 100 may be reduced in weight.

Hereinafter, the operation and effects of the caliper brake pad spring 100 according to an embodiment of the present disclosure will be described.

When the caliper brake pad spring 100 is fitted into the window 21 of the caliper body 20, the spring mounting unit 110 of the caliper brake pad spring 100 is brought into close contact with the window 21 due to elastic restoring force. In addition, the spring pressing units 120 of the caliper brake pad spring 100 applies load to the brake pads 40 by pressing the brake pads 40.

When a driver operates a brake pedal (not shown), hydraulic pressure is transmitted to the caliper body 20. Due to the hydraulic pressure, the piston 60 presses the brake pads 40 toward the brake disk 10. The brake pads 40 are moved toward the brake disk 10 so as to be into close contact and abraded with the brake disk 10, thereby generating braking power. The return springs 50 are elastically deformed. Here, the caliper brake pad spring 100 applies load to the brake pads 40 by pressing the brake pads 40 in a state in which the caliper brake pad spring 100 is mounted on the window 21 of the caliper body 20. Thus, the brake pads 40 may be moved toward the brake pads 40 while in contact with the guide pins 30, thereby pressing the brake pads 40. In addition, the caliper brake pad spring 100 may apply load to the brake pads 40 by pressing the brake pads 40 without a change in the assembled position, i.e. the set position.

In contrast, when the driver does not operate the brake pedal in the release of braking, no hydraulic pressure acts to the piston 60, so that the brake pads 40 are spaced apart from the brake disk 10. Here, the brake pads 40 may be sufficiently spaced apart to the left and the right of the brake disk 10 (in FIG. 2) due to elastic restoring force of the return spring 50. Here, the caliper brake pad spring 100 may apply load to the brake pads 40 by pressing the brake pads 40 without a change in the assembled position, i.e. the set position, even when braking is released.

As described above, the caliper brake pad spring 100 according to the present disclosure may be mounted on the window 21 of the caliper body 20 and apply load to the brake pads 40 by pressing the brake pads 40 in the set position during braking or in the release of braking, thereby minimizing a difference in the load. In addition, the caliper brake pad spring 100 may be moved toward the brake pads 40 or away from the brake pads 40 in a position in which the brake pads 40 are in contact with the guide pins, thereby preventing rattle noise.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims.

Thus, the true technical scope of the disclosure should be defined by the following claims.

What is claimed is:

1. A caliper brake pad spring comprising:
a spring mounting unit mounted on a surface of a caliper body; and
spring pressing units extending from opposed sides of the spring mounting unit in one direction to apply load to a brake pad by pressing against the brake pad,
wherein the spring mounting unit further comprises:
a first spring mounting plate disposed within a recess in the surface;
second spring mounting plates extending from first, opposed side portions of the first spring mounting plate to be bent in one direction, the second spring mounting plates being connected to the spring pressing units, and having hole portions; and
protrusions extending from the first spring mounting plate to be bent in one direction, and being disposed within the hole portions to press the first spring mounting plate within the recess due to elastic restoring force.

2. The caliper brake pad spring of claim 1, further comprising stoppers extending from second, opposed side portions of the first spring mounting plate and configured to be bent in the other direction and to press the first spring mounting plate within the recess due to elastic restoring force.

3. The caliper brake pad spring of claim 2, wherein each of the stoppers comprises:

a first stopper plate extending from second, opposed side portions of the first spring mounting unit in a direction opposite to the second spring mounting plates;
a second stopper plate extending from the first stopper plate toward the second spring mounting plates; and
a third stopper plate extending from the second stopper plate and being rounded to surround the recess, the third stopper plate being in close contact with the recess due to elastic restoring force.

4. The caliper brake pad spring of claim 3, wherein each of the stoppers further comprises a contact portion extending from the third stopper plate toward the caliper body to be bent and be in contact with the caliper body.

5. The caliper brake pad spring of claim 1, wherein the recess comprises a window, and the protrusions comprise pressing protrusions.

6. The caliper brake pad spring of claim 5, wherein each of the spring pressing units comprises:
a first spring pressing plate extending from the second spring mounting plates to be inclined in a direction opposite to the first spring mounting plate; and
a second spring pressing plate extending from the first spring pressing plate to be inclined in a direction opposite to the first spring mounting plate, in contact with and configure to press the brake pad.

7. The caliper brake pad spring of claim 6, wherein each of the spring pressing units further comprises a brake pad damage preventing portion extending from the second spring pressing plate to be bent in a direction opposite to the brake pad.

8. The caliper brake pad spring of claim 6, wherein the first spring pressing plate comprises rebound support portions to support a rebound force of the first spring pressing plate in contact with the caliper body.

9. The caliper brake pad spring of claim 6, wherein the first spring pressing plate comprises hole portions to reduce weight.

10. A brake device comprising:
a brake disk;
a caliper body surrounding the brake disk;
guide pins received in the caliper body;
brake pads disposed on both sides of the brake disk and movable along the guide pins;
a return spring in contact with the brake pad to restore the brake pads to original positions by applying elastic restoring force to the brake pads; and
a piston to press the brake pads toward the brake disk; and
a pad spring including a spring mounting unit mounted on a surface of the caliper body and spring pressing units extending from opposed sides of the spring mounting unit in one direction to apply load to the brake pads by pressing against the brake pads,
wherein the spring mounting unit further comprises:
a first spring mounting plate disposed within a recess in the surface;
second spring mounting plates extending from first, opposed side portions of the first spring mounting plate to be bent in one direction, the second spring mounting plates being connected to the spring pressing units, and having hole portions; and
protrusions extending from the first spring mounting plate to be bent in one direction, and being disposed within the hole portions to press the first spring mounting plate within the recess due to elastic restoring force.

11. The brake device of claim 10, further comprising stoppers extending from second opposed side portions of the first spring mounting plate and configured to be bent in the other direction and in close contact with the first spring mounting plate within the recess due to elastic restoring force.

12. The brake device of claim 11, wherein each of the stoppers comprises:
   a first stopper plate extending from second, opposed side portions in a direction opposite to the second spring mounting plates;
   a second stopper plate extending from the first stopper plate toward the second spring mounting plates; and
   a third stopper plate extending from the second stopper plate and being rounded to surround the recess, the third stopper plate being in close contact with the recess due to elastic restoring force.

13. The brake device of claim 12, wherein each of the stoppers further comprises a contact portion extending from the third stopper plate toward the caliper body and bent to contact the caliper body.

14. The brake device of claim 10, wherein the recess comprises a window, and the protrusions comprise pressing protrusions.

15. The brake device of claim 14, wherein each of the spring pressing units comprises:
   a first spring pressing plate extending from the second spring mounting plates inclined in a direction opposite to the first spring mounting plate; and
   a second spring pressing plate extending from the first spring pressing plate inclined in a direction opposite to the first spring mounting plate and in contact with the brake pad.

16. The brake device of claim 15, wherein each of the spring pressing units further comprises a brake pad damage preventing portion extending from the second spring pressing plate and bent in a direction opposite to the brake pad.

17. The brake device of claim 15, wherein the first spring pressing plate comprises rebound support portions to support a rebound force of the first spring pressing plate in contact with the caliper body.

18. The brake device of claim 15, wherein the first spring pressing plate comprises hole portions to reduce weight.

* * * * *